(12) United States Patent
Tiwari et al.

(10) Patent No.: US 8,414,440 B2
(45) Date of Patent: Apr. 9, 2013

(54) SINGLE PLANETARY HYBRID POWERTRAIN WITH AT LEAST THREE ELECTRICALLY-VARIABLE OPERATING MODES

(75) Inventors: Awadesh Tiwari, Bangalore (IN); Deepa Kesavan, Bangalore (IN); Atul Kumar Agrawal, Bangalore (IN); Ravikanth GV, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 802 days.

(21) Appl. No.: 12/616,168

(22) Filed: Nov. 11, 2009

(65) Prior Publication Data

US 2011/0111905 A1    May 12, 2011

(51) Int. Cl.
*F16H 37/06* (2006.01)
(52) U.S. Cl. ............................. 475/151; 475/5
(58) Field of Classification Search .................... 475/151
See application file for complete search history.

(56) References Cited

U.S. PATENT DOCUMENTS 7,288,041 B2 * 10/2007 Bucknor et al. .............. 475/151

* cited by examiner

*Primary Examiner* — David D Le
*Assistant Examiner* — Erin D Bishop
(74) *Attorney, Agent, or Firm* — Quinn Law Group, PLLC

(57) ABSTRACT

A hybrid powertrain has an engine, an input member, an output member, and a stationary member, and includes a single planetary gear set having a first, a second, and a third member. The input member is connected for common rotation with the engine. The output member is connected for common rotation with the second member. A first and a second motor/generator are provided, as well as five torque-transmitting mechanisms, including only one brake. The torque-transmitting mechanisms are engagable in different combinations to establish at least two electric-only operating mode, at least two engine-only operating mode, and at least three electrically-variable operating modes. In one embodiment, an electric torque converter operating mode is provided, and may be the default mode in case of motor/generator failure.

12 Claims, 2 Drawing Sheets

| Mode | C1 | C2 | C3 | C4 | C5 |
|---|---|---|---|---|---|
| One M/G EV | X | | | | X |
| Two M/G EV | | X | | | X |
| EVT1 | | X | X | | X |
| EVT2 | | X | | X | X |
| EVT3 | | | X | | X |
| EVT4 | | X | | X | |
| Engine-Only Fixed Gear 1 | X | | | X | |
| Engine-Only Fixed Gear 2 | | | X | X | |

| Mode | C1 | C2 | C3 | C4 | C5 |
|---|---|---|---|---|---|
| EV1 One M/G EV | X | | | | |
| EV2 Two M/G EV | | X | | | |
| EV3 Two M/G EV | X | | | | X |
| EV4 Two M/G EV | | X | | | X |
| EVT1 | | | X | | X |
| EVT2 | | X | X | | |
| EVT3 | | | X | X | |
| Engine-Only Fixed Gear 1 | X | | | X | |
| Engine-Only Fixed Gear 2 | | X | X | X | |
| Engine-Only Fixed Gear 3 | X | | | X | X |
| eTC | | | X | | |

SINGLE PLANETARY HYBRID POWERTRAIN WITH AT LEAST THREE ELECTRICALLY-VARIABLE OPERATING MODES

TECHNICAL FIELD

The invention relates to a hybrid powertrain, and specifically to a hybrid powertrain with two motor/generators, an engine, and a single planetary gear set.

BACKGROUND OF THE INVENTION

Hybrid powertrains for vehicles utilize different power sources under different vehicle operating conditions. An electro-mechanical hybrid powertrain typically has an internal combustion engine, such as a diesel engine, gasoline engine, air engine, or fuel cell, and one or more motor/generators. Different operating modes, such as an engine-only operating mode, an electric-only operating mode, and an electrically-variable operating mode are established by engaging brakes and/or clutches in different combinations and controlling the engine and motor/generators. The various operating modes are advantageous as they may be used to improve fuel economy. However, the additional components required for a hybrid powertrain, such as the motor/generators, planetary gear sets, brakes and/or clutches may increase overall vehicle cost.

SUMMARY OF THE INVENTION

A hybrid powertrain is provided with a minimal number of components without sacrificing available operating modes and performance advantages. For example, the powertrain has only one planetary gear set, two motor/generators, and five torque-transmitting mechanisms, including only one band clutch (i.e., only one brake), and is operable in at least two electric-only operating modes, at least two engine-only operating modes; and at least three electrically-variable operating modes. This configuration permits the engine to be used for vehicle launch in low battery state of charge conditions, therefore allowing a smaller battery to be used relative to other two motor/generator hybrid powertrain architectures. Furthermore, system failures, such as a failure affecting the motor/generator, may be detected and the powertrain controlled to protect against damage to the motor/generator under such circumstances. Because only one of the torque-transmitting mechanisms is a brake (i.e., a band clutch), heat generation and clutch maintenance are minimal.

Specifically, the hybrid powertrain has an engine, an input member, an output member, and a stationary member. The powertrain has only a single planetary gear set with a first, second, and a third member, preferably a ring gear member, a carrier member and a sun gear member, respectively. The input member is connected for common rotation with the engine. The output member is connected for common rotation with the second member. A first and a second motor/generator are provided, as well as five torque-transmitting mechanisms, including only one brake. The first torque-transmitting mechanism is selectively engagable to ground the first member to the stationary member. The second torque-transmitting mechanism is selectively engagable to connect the first motor/generator for common rotation with the first member. The third torque-transmitting mechanism is selectively engagable to connect the input member for common rotation with the first member. The fourth torque-transmitting mechanism is selectively engagable to connect the input member for common rotation with the third member. The fifth torque-transmitting mechanism is either selectively engagable to connect the second motor/generator for common rotation with the third member, or is selectively engagable to connect the first motor/generator for common rotation with the output member. The torque-transmitting mechanisms are engagable in different combinations to establish at least two electric-only operating modes, at least two engine-only operating modes; and at least three electrically-variable operating modes. In one embodiment, the torque-transmitting mechanisms are engaged in different combinations to establish two engine-only (fixed gear) operating modes, two electric-only operating modes, and four electrically-variable operating modes. In another embodiment, the torque-transmitting mechanisms are engaged in different combinations to establish three engine-only (fixed gear) operating modes, four electric-only operating modes, three electrically-variable operating modes, and an electric torque converter operating mode.

One or more controllers are operable to monitor operating conditions of the motor/generators such as failures of components associated with the motor/generators or failure of the motor/generators. Under predetermined operating conditions indicative of such a failure, the controller will engage those torque-transmitting mechanisms that establish one of the engine-only operating modes (or the electric torque converter operating mode) in response to the monitored operating conditions. By relying on power from the engine, damage to the motor/generators is prevented. Additionally, the one or more controllers may monitor the state of charge of an energy storage device used to provide stored energy to the motor/generators (such as a battery), and engage those torque-transmitting mechanisms that establish one of the engine-only operating modes when the state-of-charge falls below a predetermined minimum state of charge.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic illustration of a second embodiment of a hybrid powertrain.

DESCRIPTION OF THE PREFERRED EMBODIMENTS

Figures 1, 2:
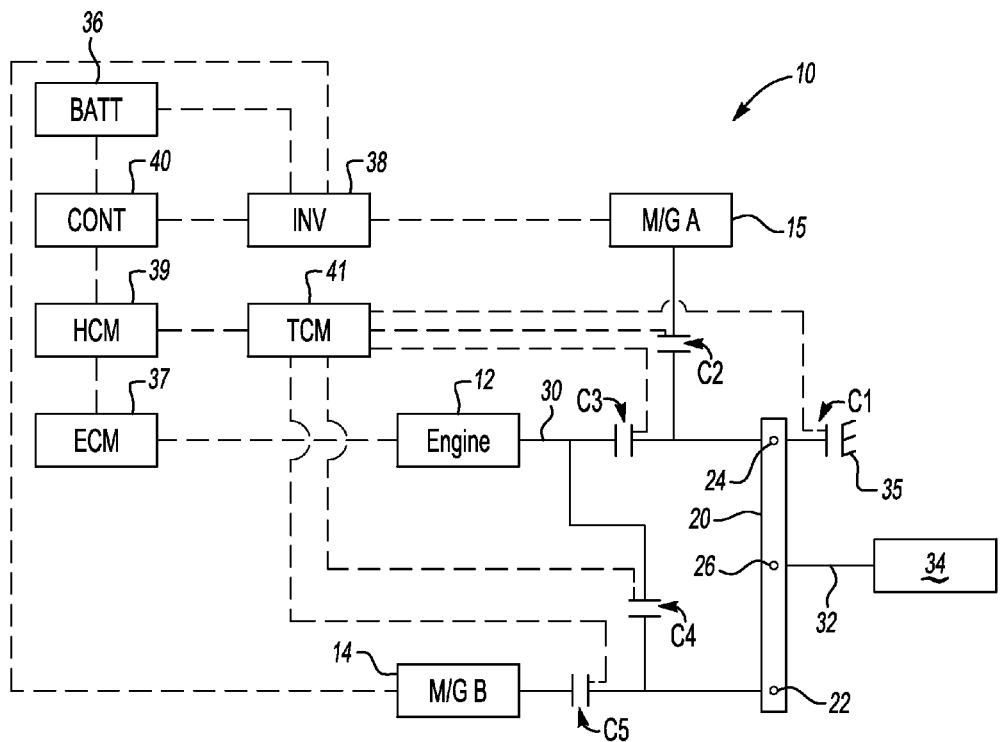
FIG. 1 is a schematic illustration of a first embodiment of a hybrid powertrain.
FIG. 2 is a chart showing an engagement schedule of the torque-transmitting mechanisms of the powertrain of FIG. 1 to establish eight different operating modes.

Referring to the drawings, wherein like reference numbers refer to like components throughout the several views, FIG. 1 shows a hybrid powertrain 10 for a vehicle. The powertrain 10 includes an engine 12 as one power source. The engine 12 may be a diesel engine, a gasoline engine, an air engine, a fuel cell or other type of power source other than an electric motor/generator. The powertrain 10 further includes a first electric motor/generator 15 (labeled M/G A in FIG. 1) and a second electric motor/generator 14 (labeled M/G B in FIG. 1).

The powertrain 10 includes a single planetary gear set 20 that has a sun gear member 22, a ring gear member 24, and carrier member 26. The carrier member 26 rotatably supports a plurality of pinion gears (not shown) that mesh with both the sun gear member 22 and the ring gear member 24, as is well understood by those skilled in the art. A person of ordinary skill in the art will readily understand the function and operation of planetary gear sets. As used herein, the ring gear member 24 is referred to as a first member of the planetary gear set 20, the carrier member 26 is referred to as a second member of the planetary gear set 20, and the sun gear member 22 is referred to as a third member of the planetary gear set 20. The members of the planetary gear set 20 may be arranged differently without departing from the scope of the claimed invention. Furthermore, a compound planetary gear set may be used in lieu of the simple planetary gear set 20, or a differential gear set may be used instead of a planetary gear set.

The engine 12 has an engine output member, such as a crankshaft, that is connected for common rotation with an input member 30. An output member 32 is connected for common rotation with the carrier member 26 and with transmission gearing 34, which may be a final drive or a transmission gearbox having additional intermeshing gears and torque-transmitting mechanisms (not shown).

Five torque-transmitting mechanisms are provided, including a first stationary-type clutch C1, also referred to as a band clutch or as brake C1. The other four torque-transmitting mechanisms, clutch C2, clutch C3, clutch C4 and clutch C5 are rotating-type clutches. Brake C1 is selectively engagable to ground the ring gear member 24 to the stationary member 35, which may be a transmission casing or other non-rotating member. Clutch C2 is selectively engagable to connect the motor/generator 15 for common rotation with the ring gear member 24. As used herein, "common rotation" means rotation at the same speed, including zero speed, or no rotation. Clutch C3 is selectively engagable to connect the input member 30 (and thereby the engine 12) for common rotation with the ring gear member 24. Clutch C4 is selectively engagable to connect the engine 12 for common rotation with the sun gear member 22. Clutch C5 is selectively engagable to connect the motor/generator 14 for common rotation with the sun gear member 22.

Each of the motor/generators 14 and 15 has both a stator and a rotor. The stators are connected with an energy storage device, such as a battery 36 through a power inverter 38 that converts direct current supplied from the battery 36 to alternating current used for powering the motor/generators 14, 15 when the respective motor/generator 14, functions as a motor, or converts alternating current from the stator to direct current to be stored in the battery 36 when the respective motor/generators 14, 15 functions as a generator, as is well understood by those skilled in the art. The advantages of the powertrain 10 could be achieved if a hydraulic or pneumatic chamber were used in lieu of a battery as the energy storage device for the motor/generator.

A motor control processor 40 is connected to the motor/generators 14, 15 to control electrical energy flow between the stators of the motor/generators 14, 15 and the battery 36 to control whether the respective motor/generator 14, 15 functions as a motor or as a generator, and the amount of torque and speed of the rotor thereof according to stored algorithms and vehicle operating conditions, as is well understood by those skilled in the art. The motor/generators 14, 15 may be configured to be rechargeable from a power grid, so that the powertrain 10 may be a plug-in hybrid.

An engine control module (ECM) 37 is operatively connected with the engine 12 and with other vehicle components, such as an accelerator position sensor, a wheel speed sensor, etc., to control operation of the engine 12 (such as engine speed, starting or stopping) in accordance with a stored algorithm. A hybrid control processor (HCM) 39 is operatively connected to the ECM 37 and to the motor control processor 40.

A transmission control module (TCM) 41 that may be part of a transmission electro-hydraulic control module (TE-HCM) including a valve body and solenoid valves is used to control engagement of torque-transmitting mechanisms, brake C1 and clutches C2, C3, C4 and C5, such as by actuating valves that control hydraulic fluid used to engage the torque-transmitting mechanisms C1, C2, C3, C4 and C5. Some or all of the ECM 37, HCM 39, CONT 40 and TCM 41 may be integrated as a single controller.

The powertrain 10 is operable in eight different modes. A mode is established by engagement of different torque-transmitting mechanisms and by providing power from one or more of the power sources. The torque-transmitting mechanism engagement schedule for the eight operating modes is set forth in FIG. 2. Launch of a vehicle with powertrain 10 may be accomplished with power supplied by the motor/generator 14 in a one motor/generator electric-only operating mode, referred to in FIG. 2 as One M/G EV. To establish the one motor/generator electric-only operating mode, brake C1 is engaged to provide reaction torque at the ring gear member 24, and clutch C5 is engaged with the motor/generator 14 controlled to operate as a motor, providing torque to sun gear member 22, which is provided to the output member 32 through the planetary gear set 20 to propel the vehicle. The single motor/generator electric-only operating mode may be used for launching the vehicle to achieve better fuel economy, as engine friction is high at vehicle launch. The single motor/generator electric-only operating mode may also be used to capture kinetic energy during braking and deceleration by feeding electric power back the into the battery 36 to recover expended charge.

A second electric-only operating mode using both motor/generators 14, 15 is referred to in FIG. 2 as Two M/G EV. To establish the second electric-only operating mode, clutches C2 and C5 are engaged to connect motor/generator 14 for common rotation with sun gear member 22, and motor/generator 15 for common rotation with ring gear member 24. Both motor/generators 14, 15 can thus provide torque to propel the vehicle. The second electric-only operating mode provides extended electric operating range to the vehicle. The second electric-only operating mode may be more efficient than extended range electric vehicles that rely on the engine to provide power to a motor/generator functioning as a generator that then in turn powers a second motor to drive the vehicle. Such extended range vehicles always require an electro-mechanical path, with associated losses in converting from mechanical power to electrical power.

Four different electrically-variable operating modes are provided in which both the engine 12 and one or both motor/generators 14, 15 provide power at the output member 32 through the planetary gear set 20. In the electrically-variable operating modes, the engine 12 can be controlled to operate at its most efficient operating speed, while the speed of one or both motor/generators 14, 15 is controlled to meet vehicle operating conditions. To establish a first electrically-variable operating mode, referred to in FIG. 2 as EVT1, clutches C2, C3 and C5 are engaged. The engine 12 provides torque at ring gear member 24, while motor/generator 14 provides torque at sun gear member 22, with the torque combined through the planetary gear set 20 at output member 32. Motor/generator 15 can provide torque or receive torque, as needed to maintain the engine 12 at its optimal speed.

To establish a second electrically-variable operating mode, referred to in FIG. 2 as EVT2, clutches C2, C4 and C5 are engaged. Thus, torque of the engine 12 and motor/generator 14 is combined at sun gear member 22, and motor/generator 15 provides torque at ring gear member 24, with the torque combined through the planetary gear set 20 at the output member 32. The engine 12 may be operated at its optimal speed, and its torque is multiplied from the sun gear member 22 to the carrier member 26.

To establish a third electrically-variable operating mode, referred to in FIG. 2 as EVT3, clutches C3 and C5 are engaged. The engine 12 provides torque at the ring gear member 24, and may be operated at its optimal speed as the motor/generator 14 provides torque at sun gear member 22.

To establish a fourth electrically-variable operating mode, referred to in FIG. 2 as EVT4, clutches C2 and C4 are engaged. The engine 12 provides torque to the sun gear member 22, while motor/generator 15 functions as a motor or as a generator as necessary to provide torque at the ring gear member 24, such that the requisite torque at the output member 32 for vehicle operating conditions is provided while still allowing the engine 12 to operate at its optimal speed.

Two different engine-only, fixed gear operating modes are provided. A first engine-only, fixed gear operating mode, referred to in FIG. 2 as Engine-Only Fixed Gear 1 is established by engaging brake C1 and clutch C4. The engine 12 provides torque at the sun gear member 22 while brake C1 provides reaction torque at ring gear member 24. Engine torque is multiplied through the planetary gear set 20. The first engine-only mode may be appropriate when relatively high torque is demanded. The motor/generators 14, 15 need not be held stationary in the first engine-only operating mode, and the engine 12 can be used to recharge the battery 36 through motor/generator 14 as necessary during this mode by engaging clutch C5 if the battery state of charge is outside of a predetermined range.

A second engine-only, fixed gear operating mode, referred to in FIG. 2 as Engine-Only Fixed Gear 2 is established by engaging clutches C3 and C4. The engine 12 provides torque at the output member 32 in a direct drive ratio, as engine torque is provided to both the ring gear member 24 and the sun gear member 22.

The engine-only operating modes may be selected when the temperature of battery 36 is outside of a predetermined acceptable temperature range for supplying power (i.e., when the battery 36 is considered to be too cold (below a predetermined minimum temperature) or too hot (above a predetermined maximum temperature). Additionally, if the battery 36 is at a full state of charge, and the vehicle is cruising at relatively high speeds, it may be more efficient to operate in an engine-only operating mode than to discharge the battery 36, as electromagnetic losses are higher and the electro-mechanical path is not as efficient. The engine-only, fixed gear operating modes are efficient during high speed cruising, when torque requirements are relatively low.

If the powertrain 10 is launched in the second electric-only operating mode, it may remain in that mode until vehicle speed requires peak power of the motor/generators 14, 15 and/or the battery state of charge falls below a specified minimum state of charge due to heavy usage. The engine 12 may then be started in an engine start/stop operating mode by engaging clutch C4 so that motor/generator 14 cranks the engine 12. Once the engine 12 gains starting speed, torque from the engine 12 may be added to the output member 32 by releasing clutch C4 and engaging clutch C3 (while clutches C2 and C5 remain engaged) to establish the first electrically-variable operating mode in which torque from both the engine 12 and the motor/generators 14, 15 is combined through the planetary gear set 20 at the output member 32 to meet higher acceleration demand from the driver. During the first electrically-variable operating mode, the motor/generator 14 may be controlled to operate as a generator, converting torque from the sun gear member 22 into stored electrical energy in the battery 36 to slow the output member 32, such as during vehicle braking.

Furthermore, the powertrain 10 is designed to transition to the engine-only operating mode in the event of the battery conditions described above, or motor-related failures, such as a failure of the motor control processor 40, the failure of a motor for an auxiliary pump used to provide lubricating fluid flow to the torque-transmitting mechanisms C1, C2 and C3 when the engine 12 is off, or a failure of motor contactor controls. In the event of such a failure, which may be indicated to the ECM 37, HCM 39, CONT 40 or TCM 41 by various sensors configured to sense vehicle operating conditions, the TCM 41 provides a control signal to cause engagement of either brake C1 and clutch C4 (first engine-only mode), or clutches C3, C4 (second engine-only mode). The motor/generators 14, 15 are protected from damage that may otherwise occur if operated during the failure event.

The powertrain 10 is of a reduced cost compared to other hybrid powertrain configurations that provide four electrically-variable operating modes, as it requires only one planetary gear set 20, and only one rotating clutch C1. Packaging may thus be simpler. Overall weight is also reduced in comparison to a hybrid powertrain with two motor/generators. Because reaction torque is available at the ring gear member 24, the powertrain 10 can be operated in an engine-only operating mode in the event of motor-related failures. The battery 36 may be downsized relative to a typical battery configured to power two motor/generators, as the engine 12 may be used to launch in low state of charge conditions, due to its direct connection with the output member 32 in the second engine-only operating mode. A desirable electric range and fuel economy of the powertrain 10 are still provided with the low cost design, due to the availability of the engine-only and electrically-variable operating modes. The electric range is comparable to other existing architectures that have two motor/generators because the motor/generator 14 is connected to the sun gear member 22 to provide higher torque and hence range. Because the engine-only operating modes are as efficient as the electrically-variable operating modes, the fuel economy achieved should remain comparable to that of other two motor/generator architectures.

Second Embodiment

FIG. 3 shows a hybrid powertrain 110 for a vehicle. The powertrain 110 includes the same components as shown and described with respect to the powertrain 10 of FIG. 1, except that clutch C5 is selectively engagable to connect the first motor/generator 15 (M/G A) for common rotation with the output member 32.

The powertrain 110 is operable in eleven different modes. The torque-transmitting mechanism engagement schedule for the eleven operating modes is set forth in FIG. 4. Launch of a vehicle with powertrain 110 may be accomplished with power supplied by the motor/generator 14 in a one motor/generator electric-only operating mode, referred to in FIG. 4 as EV1. To establish the one motor/generator electric-only operating mode, brake C1 is engaged to provide reaction torque at the ring gear member 24 with the motor/generator 14 controlled to operate as a motor, providing torque to sun gear member 22, which is provided to the output member 32 through the planetary gear set 20 to propel the vehicle. The single motor/generator, electric-only operating mode may be used for launching the vehicle to achieve better fuel economy, as engine friction is high at vehicle launch. The single motor/generator, electric-only operating mode may also be used to capture kinetic energy during braking and deceleration by feeding electric power back the into the battery 36 to recover expended charge.

Figure 4:
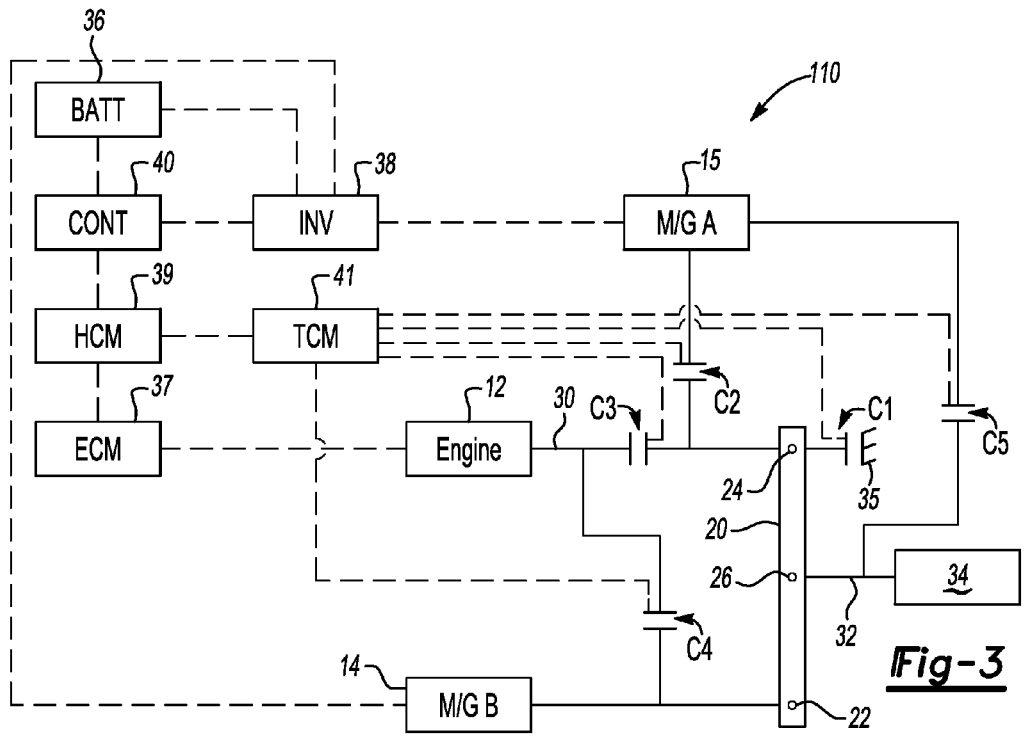
FIG. 4 is a chart showing an engagement schedule of the torque-transmitting mechanisms of the powertrain of FIG. 3 to establish eleven different operating modes.

A second electric-only operating mode using both motor/generators 14, 15 is referred to in FIG. 4 as EV2. To establish the second electric-only operating mode, clutch C2 is engaged to connect motor/generator 15 for common rotation with ring gear member 24. Both motor/generators 14, 15 can thus provide torque to propel the vehicle using controllable motor speeds. The second electric-only operating mode provides extended electric operating range to the vehicle. The second electric-only operating mode may be more efficient than extended range electric vehicles that rely on the engine to provide power to a motor/generator functioning as a generator that then in turn powers a second motor to drive the vehicle. Such extended range vehicles always require an electro-mechanical path, with associated losses in converting from mechanical power to electrical power.

A third electric-only operating mode using both motor/generators 14, 15 is referred to in FIG. 4 as EV3. To establish the third electric-only operating mode, clutches C1 and C5 are engaged to ground the ring gear member 24 to the stationary member 35 and to connect motor/generator 15 for common rotation with the output member 32. The speed of the output member 32 is thus equal to the speed of motor/generator 15. The third electric-only operating mode is an ideal mode in which to launch the vehicle as the speed of the output member 32 is easily controlled by controlling the speed of motor/generator 15. Because the motor/generator 15 can be selectively attached to the output member 32 by engaging C5, torque may be provided by both of the motor/generators 14, 15, with torque multiplication for motor/generator 14.

A fourth electric-only operating mode using both motor/generators 14, 15 is referred to in FIG. 4 as EV4. To establish the fourth electric-only operating mode, clutches C2 and C5 are engaged to connect motor/generator 15 for common rotation with both the ring gear member 24 and the output member 32, thus causing the sun gear member 22, the carrier member 26 and the ring gear member 24 of the planetary gear set 20 to rotate at the same speed, establishing an electric, direct drive mode in which the output member 32 rotates at the same speed as the motor/generator 15 (i.e., there is no torque multiplication through the planetary gear set 20). The fourth electric-only operating mode EV4 is ideally suited for low speed cruising.

Three different electrically-variable operating modes are provided in which both the engine 12 and one or both motor/generators 14, 15 provide power at the output member 32 through the planetary gear set 20. To establish a first electrically-variable operating mode, referred to in FIG. 4 as EVT1, clutches C3 and C5 are engaged. The engine 12 provides torque at the ring gear member 24, while motor/generator 14 provides torque at sun gear member 22. Motor/generator 15 provides torque to or receives torque from the output member 32 such that the first electrically-variable operating mode is a low speed, input split operating mode.

To establish a second electrically-variable operating mode, referred to in FIG. 4 as EVT2, clutches C2 and C3 are engaged. The engine 12 provides torque at the ring gear member 24, while motor/generator 15 provides torque to the ring gear member 24 to share loading with the engine 12. Motor/generator 14 provides torque at or receives torque from the sun gear member 22 to enable the engine 12 to maintain an optimal operating speed while meeting vehicle operating conditions. The second electrically-variable operating mode is an output split mode ideal for high speeds.

To establish a third electrically-variable operating mode, referred to in FIG. 4 as EVT3, clutches C2 and C4 are engaged. The engine 12 provides torque at the sun gear member 22, while motor/generator 15 provides torque at ring gear member 24 to enable the engine 12 to maintain an optimal operating speed. Motor/generator 14 provides torque to or receives torque at the sun gear member 22 to share loading with the engine 12. The third electrically-variable operating mode is an output split mode ideal for high speeds, but with less speed reduction than EVT2.

Three different engine-only, fixed gear operating modes are provided. A first engine-only, fixed gear operating mode, referred to in FIG. 4 as Engine-Only Fixed Gear 1 is established by engaging brake C1 and clutch C4. The engine 12 provides torque at the sun gear member 22 while brake C1 provides reaction torque at ring gear member 24. Engine torque is multiplied through the planetary gear set 20. The first engine-only mode may be appropriate when relatively high torque is demanded. The motor/generator 14 need not be held stationary in the first engine-only operating mode, and the engine 12 can be used to recharge the battery 36 through motor/generator 14 as necessary during this mode if the battery state of charge is outside of a predetermined range.

A second engine-only, fixed gear operating mode, referred to in FIG. 4 as Engine-Only Fixed Gear 2 is established by engaging clutches C2, C3 and C4. The engine 12 provides torque at the ring gear member 24 and the sun gear member 22. Because the engine 12 is connected for rotation with both the ring gear member 24 and the sun gear member 22, Engine-Only Fixed Gear 2 is a direct drive operating mode (i.e., with no torque multiplication from the engine 12 to the output member 32). This operating mode is well suited for cruising at a constant vehicle speed. The motor/generators 14, 15 need not be held stationary in the second engine-only operating mode, and the engine 12 can be used to recharge the battery 36 through either or both motor/generators 14, 15 as necessary during this mode if the battery state of charge is outside of a predetermined range.

A third engine-only, fixed gear operating mode, referred to in FIG. 4 as Engine-Only Fixed Gear 3 is established by engaging brake C1 and clutches C4 and C5. The engine 12 provides torque at the sun gear member 22 while the ring gear member 24 is held stationary, resulting in high torque multiplication through the planetary gear set 20, ideal for acceleration, vehicle launch, or wide open throttle conditions. Motor/generators 14, 15 need not be held stationary in the second engine-only operating mode, and the engine 12 can be used to recharge the battery 36 through motor/generators 14, 15 as necessary during this mode if the battery state of charge is outside of a predetermined range.

An electric torque converter operating mode, referred to in FIG. 4 as eTC mode, is established by engaging clutch C3. The engine 12 provides torque at the ring gear member 24, resulting in torque multiplication at the output member 32 through the planetary gear set 20. Motor/generator 14 provides reaction torque at the sun gear member 22 to enable the engine 12 torque to be multiplied through the planetary gear set 20. The eTC mode may be a default mode established under the control of the controller 40 in the event of monitored vehicle operating conditions indicative of a failure of motor/generator 15.

As with powertrain 10, powertrain 110 is of a reduced cost compared to other hybrid powertrain configurations that provide three electrically-variable operating modes, as it requires only one planetary gear set 20, and only one rotating clutch C1. Packaging may thus be simpler. Overall weight is also reduced in comparison to a hybrid powertrain with two motor/generators. The four electric-only operating modes provide good electric range capability in comparison to other hybrid vehicles having only a single planetary gear set. Vehicle launch is available in many different operating modes, including electric-only operating mode EV3, two engine-only, fixed gear operating modes (FG1 and FG2), and electrically-variable operating mode EVT1.

Because reaction torque is available at the ring gear member 24, the powertrain 110 can be operated in an engine-only operating mode in the event of motor-related failures. If motor/generator 14 fails, either of Engine-Only Fixed Gear 1 or Engine-Only Fixed Gear 3 operating modes are available to provide either of two levels of torque multiplication. In the event of a failure of motor/generator 15, the electric torque converter eTC mode is available with the planetary gear set 20 allowing torque multiplication of the engine torque as motor/generator 14 provides reaction torque at the sun gear member 22. Two different direct drive modes are available, such as for during vehicle cruising, one as an electric-only operating mode (EV4), and the other as an engine-only operating mode (FG2). Two of the engine-only, fixed gear modes (Engine-Only Fixed Gear 2 and Engine-Only Fixed Gear 3) are operable with both motor/generators 14 and 15 on, allowing an opportunity for battery charging or balancing. For example, if battery SOC is full (at or above 90%), the battery 36 cannot take any more charging current. In such situations, if the vehicle 110 is cruising, the engine-only modes are more efficient than electric-only modes. However, if the engine 12 is providing an amount of power that suffices to meet output requirements as well as to charge the battery 36 and still operate at an efficient point, the electromechanical path may be used with the engine 12 driving the vehicle wheels directly as well as through motor/generator 14, without using the battery 36. In case of cold conditions or hot battery conditions, the battery 36 may not be ready to charge immediately, and engine-only modes may be used.

Finally, two of the electrically-variable operating modes (EVT2 and EVT3) are load-sharing modes in that one of the motor/generators is connected with the engine 12 and can assist the engine 12 in providing torque.

The battery 36 may be downsized relative to a typical battery configured to power two motor/generators, as the engine 12 may be used to launch the vehicle in low state of charge conditions, due to its direct connection with the output member 32 in the second engine-only operating mode. Desirable electric range and fuel economy of the powertrain 110 are still provided with the low cost design, due to the availability of the engine-only and electrically-variable operating modes. The electric range is comparable to other existing architectures that have two motor/generators because the motor/generator 14 is connected to the sun gear member 22 to provide higher torque and hence range. Because the engine-only operating modes are as efficient as the electrically-variable operating modes, the fuel economy achieved should remain comparable to that of other two motor/generator architectures.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain for a vehicle comprising:
an engine;
an input member, an output member, and a stationary member;
a single planetary gear set having a first, a second, and a third member; wherein the input member is connected for common rotation with the engine; wherein the output member is connected for common rotation with the second member;
a first and a second motor/generator;
a first, a second, a third, a fourth, and a fifth torque-transmitting mechanism;
wherein the first torque-transmitting mechanism is selectively engagable to ground the first member to the stationary member; wherein the second torque-transmitting mechanism is selectively engagable to connect the first motor/generator for common rotation with the first member; wherein the third torque-transmitting mechanism is selectively engagable to connect the input member for common rotation with the first member; wherein the fourth torque-transmitting mechanism is selectively engagable to connect the input member for common rotation with the third member; wherein the fifth torque-transmitting mechanism is selectively engagable to connect one of the motor/generators for common rotation with one of the third member and the output member; and wherein the torque-transmitting mechanisms are engagable in different combinations to establish at least two electric-only operating modes, at least two engine-only operating modes; and at least three electrically-variable operating modes.

2. The hybrid powertrain of claim 1, wherein the first and fifth torque-transmitting mechanisms are engaged and the first motor/generator is operated as a motor to establish one of the at least two electric-only operating modes; and
wherein the second and the fifth torque-transmitting mechanisms are engaged and the first and second motors are operated as motors to establish another of the at least two electric-only operating modes.

3. The hybrid powertrain of claim 1, wherein the at least two electric-only operating modes include
a first electric-only operating mode in which the first torque-transmitting mechanism is engaged and the first motor/generator is operated as a motor,
a second electric-only operating mode in which the second torque-transmitting mechanism is engaged and both motor/generators are operated as motors,
a third electric-only operating mode in which the first and the fifth torque-transmitting mechanisms are engaged and both motor/generators are operated as motors, and
a fourth electric-only operating mode in which the second and fifth torque-transmitting mechanisms are engaged and the first and second motor/generators are operated as motors.

4. The hybrid powertrain of claim 1, wherein the fifth torque-transmitting mechanism is selectively engagable to connect the second motor/generator for common rotation with the third member; wherein the second, the third and the fifth torque-transmitting mechanisms are engaged to establish a first of the electrically-variable operating modes in which the engine and one or both of the motor/generators provide torque at the output member through the planetary gear set;

wherein the second, the fourth and the fifth torque-transmitting mechanisms are engaged to establish a second of the at least three electrically-variable operating modes in which the engine and one or both of the motor/generators provide torque at the output member through the planetary gear set;

wherein the third and the fifth torque-transmitting mechanisms are engaged to establish a third of the at least three electrically-variable operating modes in which the engine and one or both of the motor/generators provide torque at the output member through the planetary gear set; and wherein the second and the fourth torque-transmitting mechanisms are engaged to establish a fourth of the at least three electrically-variable operating modes in which the engine and one or both of the motor/generators provides torque at the output member through the planetary gear set.

5. The hybrid powertrain of claim 1, wherein the second motor/generator is connected for common rotation with the third member and the fifth torque-transmitting mechanism is selectively engagable to connect the first motor/generator for common rotation with the output member; wherein the third and the fifth torque-transmitting mechanisms are engaged to establish a first of the at least three electrically-variable operating modes in which the engine and one or both of the motor/generators provide torque at the output member through the planetary gear set;

wherein the second and the third torque-transmitting mechanisms are engaged to establish a second of the at least three electrically-variable operating modes in which the engine and one or both of the motor/generators provide torque at the output member through the planetary gear set; and wherein the second and the fourth torque-transmitting mechanisms are engaged to establish a third of the at least three electrically-variable operating modes in which the engine and one or both of the motor/generators provide torque at the output member through the planetary gear set.

6. The hybrid powertrain of claim 1, wherein the first and the fourth torque-transmitting mechanisms are engaged and the engine is powered to provide torque at the output member through the planetary gear set in a first of the at least two engine-only operating modes; and wherein the third and the fourth torque-transmitting mechanisms are engaged and the engine is powered to provide torque at the output member through the planetary gear set in a second of the at least two engine-only operating modes.

7. The hybrid powertrain of claim 6, further comprising:
an energy storage device operatively connected to the motor/generators for providing stored energy thereto; and one or more controllers operable to monitor operating conditions of the energy storage device and the motor/generators and to establish one of the engine-only operating modes in response to the monitored operating conditions being indicative of stored energy less than a predetermined level or of failure of at least one of the motor/generators.

8. The hybrid powertrain of claim 1, wherein the first and the fourth torque-transmitting mechanisms are engaged and the engine is powered to provide torque at the output member through the planetary gear set in a first of the at least two engine-only operating modes;

wherein the second, the third, and the fourth torque-transmitting mechanisms are engaged and the engine is powered to provide torque at the output member through the planetary gear set in a second of the at least two engine-only operating modes;

wherein the first, the fourth, and the fifth torque-transmitting mechanisms are engaged and the engine is powered to provide torque at the output member through the planetary gear set in a third of the at least two engine-only operating modes; and wherein the third torque-transmitting mechanism is engaged and the engine is powered to establish an electric torque converter operating mode in which torque from the engine is multiplied via the planetary gear set and the second motor/generator provides torque at the sun gear member.

9. The hybrid powertrain of claim 8, further comprising:
an energy storage device operatively connected to the motor/generators for providing stored energy thereto; and one or more controllers operable to monitor operating conditions of the energy storage device and the motor/generators and to establish either one of the engine-only operating modes or the electric torque converter operating mode in response to the monitored operating conditions being indicative of stored energy less than a predetermined level or of failure of at least one of the motor/generators.

10. The hybrid powertrain of claim 1, wherein the first member is a ring gear member, the second member is a carrier member, and the third member is a sun gear member.

11. A hybrid powertrain for a vehicle comprising:
an engine;
an input member, an output member, and a stationary member;
a single planetary gear set having a ring gear member, a sun gear member and a carrier member; wherein the input member is connected for common rotation with the engine; wherein the output member is connected for common rotation with the carrier member;
a first and a second motor/generator;
a first, a second, a third, a fourth, and a fifth torque-transmitting mechanism;
wherein the first torque-transmitting mechanism is selectively engagable to ground the first member to the stationary member; wherein the second torque-transmitting mechanism is selectively engagable to connect the first motor/generator for common rotation with the first member; wherein the third torque-transmitting mechanism is selectively engagable to connect the input member for common rotation with the first member; wherein the fourth torque-transmitting mechanism is selectively engagable to connect the input member for common rotation with the third member; wherein the fifth torque-transmitting mechanism is selectively engagable to connect the second motor/generator for common rotation with the third member; and wherein the torque-transmitting mechanisms are engagable in different combinations to establish two electric-only operating modes, two engine-only operating modes; and four electrically-variable operating modes.

12. The hybrid powertrain of claim 11, further comprising:
an energy storage device operatively connected to the motor/generators for providing stored energy thereto; and one or more controllers operable to monitor operating conditions of the energy storage device and the motor/generators and to establish one of the engine-only operating modes in response to the monitored operating conditions being indicative of stored energy less than a predetermined level or of failure of at least one of the motor/generators.

* * * * *